United States Patent
Bulan et al.

(10) Patent No.: US 8,737,690 B2
(45) Date of Patent: May 27, 2014

(54) VIDEO-BASED METHOD FOR PARKING ANGLE VIOLATION DETECTION

(75) Inventors: Orhan Bulan, Greece, NY (US); Robert P. Loce, Webster, NY (US); Edgar A. Bernal, Webster, NY (US); Yao Rong Wang, Webster, NY (US); Graham S. Pennington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 580 days.

(21) Appl. No.: 13/461,221

(22) Filed: May 1, 2012

(65) Prior Publication Data

US 2013/0266187 A1    Oct. 10, 2013

Related U.S. Application Data (63) Continuation-in-part of application No. 13/441,269, filed on Apr. 6, 2012, and a continuation-in-part of application No. 13/441,253, filed on Apr. 6, 2012, now Pat. No. 8,666,117.

(51) Int. Cl.
*G06K 9/00* (2006.01)
*G08G 1/16* (2006.01)

(52) U.S. Cl.
USPC .............................. 382/104; 382/291; 340/903

(58) Field of Classification Search
CPC ............. G06K 9/00; G07B 15/02; G08G 1/16
USPC ......... 382/100, 103–107, 155, 162, 168, 173, 382/181, 199, 209, 232, 254, 274, 276, 382/286–294, 305, 312; 340/932.2, 937, 340/432; 348/169, 148
See application file for complete search history.

(56) References Cited

U.S. PATENT DOCUMENTS

| | | | |
|---|---|---|---|
| 6,081,206 A * | 6/2000 | Kielland | 340/937 |
| 6,285,279 B1 * | 9/2001 | Yamazaki | 340/432 |
| 6,285,297 B1 | 9/2001 | Ball | |
| 6,747,687 B1 * | 6/2004 | Alves | 348/148 |
| 8,120,513 B2 * | 2/2012 | Ioli | 340/932.2 |
| 2003/0076417 A1 * | 4/2003 | Thomas et al. | 348/169 |
| 2012/0007983 A1 * | 1/2012 | Welch | 348/148 |
| 2012/0148105 A1 | 6/2012 | Burry et al. | |
| 2012/0263352 A1 * | 10/2012 | Fan et al. | 382/105 |
| 2013/0028481 A1 | 1/2013 | Wu | |

OTHER PUBLICATIONS http://www.nytimes.com/2011/09/19/nyregion/uprooting-the-old-familiar-parking-meter.html?_4=1&goback+%2Egde_153603_member_72027013, Dated Sep. 18, 2011; 3 pgs.

(Continued)

*Primary Examiner* — Seyed Azarian
(74) *Attorney, Agent, or Firm* — Fay Sharpe LLP (57) ABSTRACT

A method and a system for determining a parking angle violation includes receiving video data from a sequence of frames taken from an image capture device monitoring a parking area. The method further includes determining a first line in a current frame where the line represents a nominal orientation of the parking area. The method includes detecting a presence of a vehicle in the parking area. The method includes determining a second line in the frame where the line represents the orientation of the detected vehicle. The method further includes computing an angle between the first and second lines. The method includes determining whether the detected vehicle is violating a parking regulation based on the computed angle.

20 Claims, 9 Drawing Sheets

(56) References Cited

OTHER PUBLICATIONS www.streetsmarttechnology.com, retrieved from the Internet Aug. 6, 2012, 10 pgs.

Wren et al., "Pfinder: Real-Time Tracking of the Human Body", in IEEE Transactions on Pattern Analysis and Machine Intelligence, Jul. 1997, vol. 19, No. 7, pp. 780-785.

Friedman et al., "Image segmentation in video sequences: A probabilistic approach", in Proc. of the Thirteenth Conference on Uncertainty in Artificial Intelligence (UAI), Aug. 1-3, 1997.

Stauffer et al., "Adaptive background mixture models for real-time tracking", in Proc. of the 1999 Conference on Computer Vision and Pattern Recognition (CVPR '99), pp. 2246-2252, 1999.

Makarov et al., "Intrusion detection using extraction of moving edges", in $12^{th}$ IAPR Int. Conf. on Pattern Recognition, vol. 1 of IAPR, pp. 804-807, IEEE Press, 1994.

Paragious et al., "Detection and location of moving objects using deterministic relaxation algorithms", in ICPR, No. 13, pp. 201-286, Vienna, Austria, Aug. 1996.

http://www.alibaba.com/product-gs/373281312/Ultrasonic_Parking_Sensor.html, retrieved from the Internet Mar. 28, 2012; 4 pgs.

Oliver et al., "A Bayesian Computer Vision System for Modeling Human Interactions", IEEE Transactions on PAMI, pp. 831-843.

Lo et al., "Automatic congestion detection system for underground platforms, "Proc. of 2001 Int Symp. on Intell. Multimedia, Video and Speech Processing, pp. 158-161.

Prati et al., "Shadow Detection Algorithms for Traffic Flow Analysis: a Comparative Study", In Proc. IEEE Intelligent Transportation Systems, 2001.

Cucchiara et al., "Improving Shadow Suppression in Moving Object Detection with HSV Color Information", Proc. of IEEE Intelligent Transportation Systems, 2001.

Zhang, "A flexible new technique for camera calibration", IEEE Trans. on Pattern Analysis and Machine Intelligence, vol. 22 (11), pp. 1330-1334 (2000).

http://www.nyc.gov/html/dof/html/parking/park_tickets_violations.shtml, retrieved from the internet Aug. 6, 2012.

http://www.sanjoseca.gov/transportation/onstreet_regulations.htm, retrieved from the internet Aug. 6, 2012.

http://www.portlandoregon.gov/transportation/article/59926, retrieved from the internet Aug. 6, 2012.

http://vancouver.ca/bylaws/2849c.pdf, Street and Traffic By-Law No. 2849, Oct. 18, 2011.

http://parkitnyc.com/parking-nyc/nyc-parking-tickets/, retrieved from the internet Aug. 6, 2012.

Agarwal et al., "Learning to detect objects in images via a sparse, part-based representation", Pattern Analysis and Machine Intelligence, IEEE Transactions on, vol. 26, No. 11, pp. 1475-1490, Nov. 2004.

Tsai et al., "Vehicle Detection Using Normalized Color and Edge Map," Image Processing, IEEE Transactions on, vol. 16, No. 3, pp. 850-864, Mar. 2007.

Duncan, et al., "Temporal edges: The detection of motion and the computation of optical flow", in Proc. Second Int. Conf. Comput. Vision, Tampa, FL, Dec. 1988, pp. 374-382.

Comaniciu et al., "Real-time tracking of non-rigid objects using mean shift", in: Proceedings of IEEE Conference on Computer Vision and Pattern Recognition (CVPR'00), South Carolina, 2000, pp. 142-149.

Kass et al., "Snakes: Active Contour Models", Int'l Journal of Computer Vision, pp. 321,331, 1988.

Dickmanns et al., "Dynamic monocular machine vision", Machine Vision and Applications 1: 1223-240, 1988.

Gustafsson et al., "Particle Filters for Positioning, Navigation and Tracking", IEEE Transactions on Signal Processing, 2002.

http://en.wikipedia.org/wiki/Hough_transform, "Hough transform", retrieved from the internet Aug. 6, 2012, last modified Aug. 1, 2012.

Ma et al., "Edge-based rich representation for vehicle classification", Proc. of IEEE Computer Vision (ICCV), 2005.

\* cited by examiner

VIDEO-BASED METHOD FOR PARKING ANGLE VIOLATION DETECTION

CROSS REFERENCE TO RELATED PATENTS AND APPLICATIONS

This application claims the priority, as a continuation-in-part, of co-pending U.S. application Ser. No. 13/441,269, filed Apr. 6, 2012 and entitled "A System and Method for Available Parking Space Estimation for Multispace On-Street Parking" by Orhan Bulan et al.; and U.S. application Ser. No. 13/441,253, filed Apr. 6, 2012 and entitled "Video-Based System And Method For Detecting Exclusion Zone Infractions" by Orhan Bulan et al., the disclosures of each of which are incorporated herein by reference in their entireties.

BACKGROUND

The present disclosure relates to a video-based method and system for computing angle positions of parked vehicles relative to a street or curb and for determining parking violations based on the angle positions. The disclosure finds application in parking space management and enforcement. However, it is appreciated that the present exemplary embodiments are also amendable to other like applications.

Municipalities regulate parking in certain areas for public safety and ease of access reasons. One example regulation can specify an angle that a vehicle is permitted to park. More specifically, a regulation can specify that a vehicle must park parallel to a curb unless angled parking is otherwise permitted by a condition or exception. A parking angle violation can occur when a vehicle parks at an angle relative to the nominal orientation of a parking area, such as defined by a curb or painted line.

One area that is regulated by a parking angle regulation can include on-street parking lanes that extend along a street. This area can be regulated in populated regions that have limited roadways. Vehicles that fail to park at a lawful angle can jut out into the driving lane and present an obstruction or hazard to traffic moving in the lane. Therefore, infractions of parking angle regulations can result in substantial fines for the violators and can generate significant revenue for municipalities.

Traditionally, a detection of parking angle violations is performed by traffic law enforcement officers. However, this method is costly in labor required for inspection and in fines lost from undetected violations. In an effort to reduce costs and improve efficiency, municipalities are exploring the use of new technologies for automating traffic law enforcement.

One technology that has been used to automate parking management includes sensor-based methods that use sensors that output a binary signal when a vehicle is detected in a parking area. However, a high cost for installation and maintenance is associated with the sensors. Video-based technology is also being explored in other parking enforcement and management areas, such as for monitoring short term parking and for determining parking space availability. However, the video-based technology has not been extended to monitoring vehicle angle positions relative to parking space curbs and boundaries for enforcing parking angle regulations.

There is a need for a system and a method that uses video data received by a video-sensor for determining an occurrence of a violation.

CROSS REFERENCE TO RELATED PATENTS AND APPLICATIONS

This application is related to co-pending application Ser. No. 13/461,266, filed herewith, entitled "Video-Based Method for Detecting Parking Boundary Violations" by Orhan Bulan et al., the application of which is incorporated herein in its entirety.

BRIEF DESCRIPTION

Embodiments of the present application relate to a method and a system for determining a parking angle violation. The method includes receiving video data from a sequence of frames taken from an image capture device monitoring a parking area. The method further includes determining a first line in a current frame where the line represents a nominal orientation of the parking area. The method includes detecting a presence of a vehicle in the parking area. The method includes determining a second line in the frame where the line represents the orientation of the detected vehicle. The method further includes computing an angle between the first and second lines. The method includes determining whether the detected vehicle is violating a parking regulation based on the computed angle.

DETAILED DESCRIPTION

The present disclosure relates to a video-based method and system for determining parking angle violations. The system is adapted to compute angles at which vehicles are parked in a regulated region where only parking parallel to the orientation of a nominal parking area is permitted. Alternatively, the system can be also adapted to detect vehicles that are parked parallel to the curb in a regulated region where only angled parking is permitted. The system is further adapted to use the angle information to determine parking violations. A video camera is used to monitor parking spaces. The acquired video can be processed locally or transferred to a central processor where it is analyzed to detect vehicles that are parked at an angle to a curb or painted line in the parking area. This information is reported to entities that are authorized to enforce parking boundary regulations.

Figure 1:
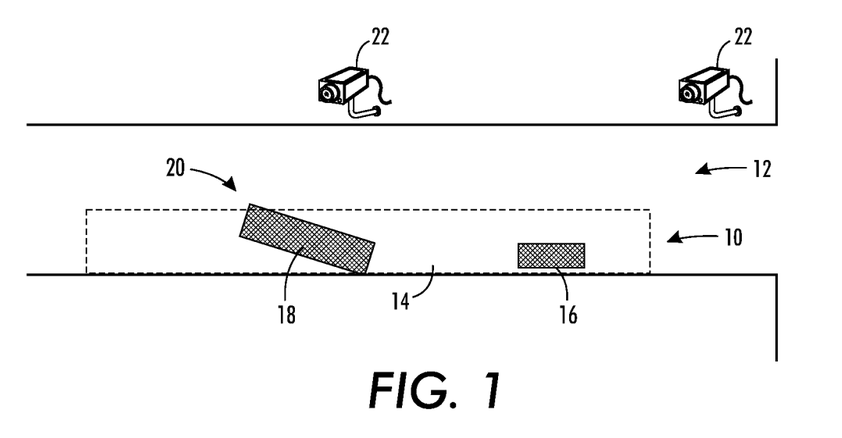
FIG. 1 shows an example scenario for detecting a vehicle parked at an angle to a curb.

FIG. 1 shows an example scenario for detecting a parking angle violation in a parking area. An on-street parking area 10 extends along a curb on a street 12. The parking area 10 is more specifically a parking lane (shown in phantom) that extends along a street curb 14. Two vehicles 16, 18 are parked in the parking area 10. A first vehicle 16 is parallel parked inside the general boundaries of the parking area 10. A second vehicle 18 is parked at an angle in the parking area 10. An end of the second vehicle 18 is therefore jutting out into a driving lane 20 that is designated for moving traffic. Video cameras 22 are installed across the street for continuously monitoring the parking area 10. The cameras 22 provide video feed to a processor of the system, which analyzes the video data to determine whether the vehicles 16, 18 are violating the parking angle regulation. Because the second vehicle 18 is determined to not be properly parked parallel to the curb 14, the system indicates that it is violating the regulation. While other means of parking area designation can be used, such as painted lines, or raised dots, we use the term curb to encompass all these means within the present disclosure so as to simplify the teaching. Hence, the curb can be used to define the nominal parking area orientation.

While FIG. 1 illustrates the example scenario as including an on-street parking area, there is no limitation made to an application of the concepts discussed in the disclosure. For example, the system can be used to detect an inappropriate parking angle in an area where angle parking is permitted. The system can also detect double parking violations in parking lots, garages, and other managed areas.

Figure 2:
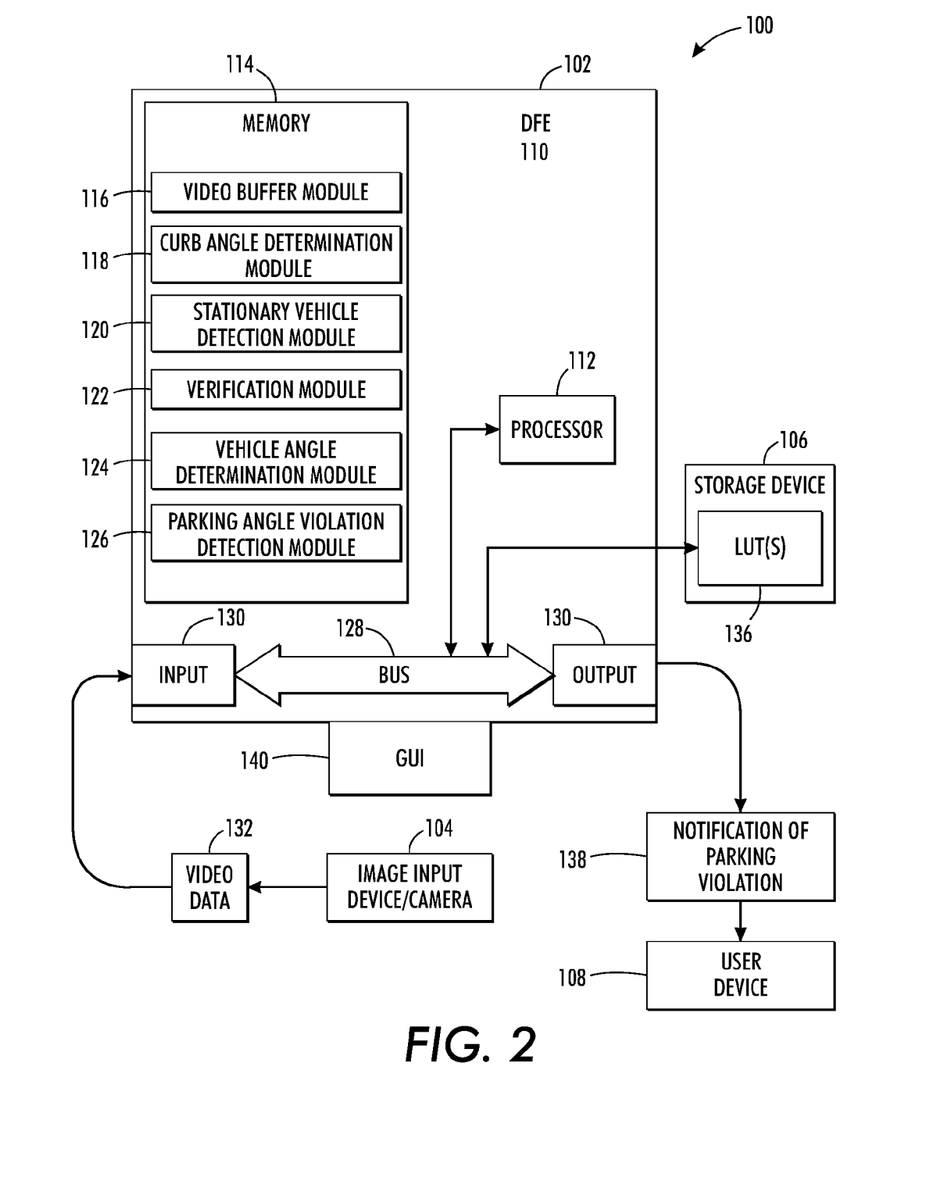
FIG. 2 is a schematic illustration of a parking angle violation detection system according to one embodiment.

FIG. 2 is a schematic illustration of a parking angle violation detection system 100 in one exemplary embodiment. The system includes a detection device 102, an image capture device 104, and a storage device 106, which may be linked together by communication links, referred to herein as a network. In one embodiment, the system 100 may be in further communication with a user device 108. These components are described in greater detail below.

The detection device 102 illustrated in FIG. 2 includes a controller 110 that is part of or associated with the detection device 102. The exemplary controller 110 is adapted for controlling an analysis of video data received by the system 100. The controller 110 includes a processor 112, which controls the overall operation of the detection device 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the detection device 102, executes instructions stored in memory 114 for performing the parts of the method outlined in FIGS. 3-5. In some embodiments, the processor 112 and memory 114 may be combined in a single chip.

The detection device 102 may be embodied in a networked device, such as the image capture device 104, although it is also contemplated that the detection device 102 may be located elsewhere on a network to which the system 100 is connected, such as on a central server, a networked computer, or the like, or distributed throughout the network or otherwise accessible thereto. The vehicle detection and violation determination phases disclosed herein are performed by the processor 112 according to the instructions contained in the memory 114. In particular, the memory 114 stores a video buffering module 116, which captures video of a select parking area; a curb angle determination module 118, which determines an angle of the curb in the captured video; a stationary vehicle detection module 120, which detects vehicles that are in the parking area of interest; a verification module 122, which verifies that the detected vehicles are parked in the area of interest; a vehicle angle determination module 124, which estimates an angle at which the detected vehicle is parked; and, a parking angle violation detection module 126, which determines whether the vehicle is violating a parking angle regulation using the curb angle and the vehicle angle and triggers a notification to enforcement authorities when a violation is determined. Embodiments are contemplated wherein these instructions can be stored in a single module or as multiple modules embodied in the different devices. The modules 116-126 will be later described with reference to the exemplary method.

The software modules as used herein, are intended to encompass any collection or set of instructions executable by the detection device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the detection device 102 may be all connected by a bus 128.

With continued reference to FIG. 2, the detection device 102 also includes one or more communication interfaces 130, such as network interfaces, for communicating with external devices. The communication interfaces 130 may include, for example, a modem, a router, a cable, and/or Ethernet port, etc. The communication interfaces 130 are adapted to receive video and/or image data 132 as input.

The detection device 102 may include one or more special purpose or general purpose computing devices, such as a server computer or digital front end (DFE), or any other computing device capable of executing instructions for performing the exemplary method.

FIG. 2 further illustrates the detection device 102 connected to an image source 104 for inputting and/or receiving the video data and/or image data (hereinafter collectively referred to as "video data") in electronic format. The image source 104 may include an image capture device, such as a camera. The image source 104 can include one or more surveillance cameras that capture video data from the parking area of interest. The number of cameras may vary depending on a length and location of the area being monitored. It is contemplated that the combined field of view of multiple cameras typically comprehends the entire parking area being regulated and enforced. For performing the method at night in parking areas without external sources of illumination, the cameras 104 can include near infrared (NIR) capabilities at the low-end portion of a near-infrared spectrum (700 nm-1000 nm).

In one embodiment, the image source 104 can be a device adapted to relay and/or transmit the video captured by the camera to the detection device 102. In another embodiment, the video data 132 may be input from any suitable source, such as a workstation, a database, a memory storage device, such as a disk, or the like. The image source 104 is in communication with the controller 110 containing the processor 112 and memories 114.

With continued reference to FIG. 2, the system 100 includes a storage device 106 that is part of or in communication with the detection device 102. In a contemplated embodiment, the detection device 102 can be in communication with a server (not shown) that includes a processing device and memory, such as storage device 106, or has access to a storage device 106, for storing look-up tables (LUTs) 136 that can associate area-specific parking regulations, conditions, and exceptions for each particular camera used by the system 100. Other LUTs can associate actual coordinates to pixel coordinates.

With continued reference to FIG. 2, the video data 132 undergoes processing by the detection device 102 to output notice of a parking angle violation 138 to an operator in a suitable form on a graphic user interface (GUI) 140 or to a user device 108, such as a computer belonging to an enforcement authority. The user device 108 can include a computer at a dispatch center, a smart phone belonging to an enforcement driver in transit or to a vehicle computer and/or GPS system that is in communication with the detection device 102, although there is no limitation made herein to these examples. The user device 108 can further include a central server and repository that automatically charges an account associated with a registrant of the violating vehicle, automatically issues a ticket to the registrant, automatically provides the registrant's information to the authority, or performs a combination of the above. In another contemplated embodiment, the user-device 108 can belong to a driver of the vehicle that is violating the parking angle regulation. In this manner, the driver can be put on notice that the vehicle should be adjusted to park in a more parallel position. The GUI 140 can include a display, for displaying information, such as the location of the infraction and information regarding the vehicle violating the parking angle violation, to users, and a user input device, such as a keyboard or touch or writable screen, for receiving instructions as input, and/or a cursor control device, such as a mouse, trackball, or the like, for communicating user input information and command selections to the processor 112.

Figure 3:
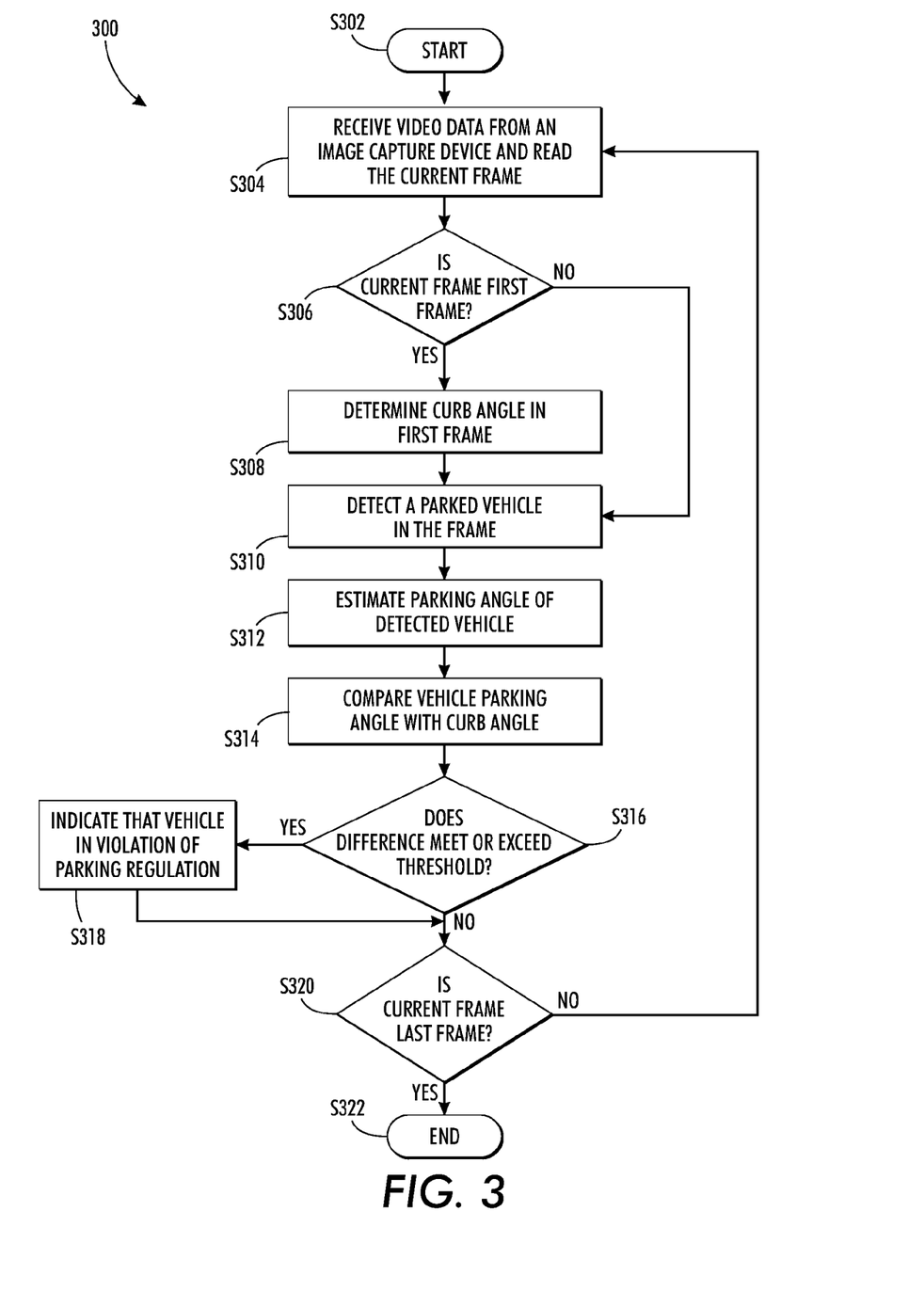
FIG. 3 is a flowchart describing an overview of a method for determining a parking angle violation.

FIG. 3 is a flowchart describing an overview of a method for determining a parking angle violation. The method starts at S302. The system receives video data from an image capture device that is monitoring a parking area and reads a current frame at S304. The system determines whether the current frame is a first frame to be processed in the video sequence at S306. In response to the current frame being the first frame (YES at S306), the frame is processed for determining an angle of a curb or a similar reference marker and/or feature situated proximate to the parking area S308. In response to the current frame not being the first frame (NO at S306), the curb and/or reference angle is already known and the current frame is processed to detect whether a parked vehicle is captured in the frame at S310. A detected vehicle is processed to determine an angle that the vehicle is parked in the parking area at S312. The vehicle parking angle is compared to the curb angle at S314. The difference between the angles is compared to a threshold at S316. In response to the threshold being met or exceeded (YES at S316), the system indicates that the detected vehicle is in violation of a parking regulation at S318. Otherwise, the system determines whether the current frame is the last frame in the video sequence at S320. In response to the current frame not being the last frame (NO at S320), the method returns to S304 and repeats for the next frame in the sequence. In response to the current frame being the last frame (YES at S320), the method ends at S324.

Figure 4:
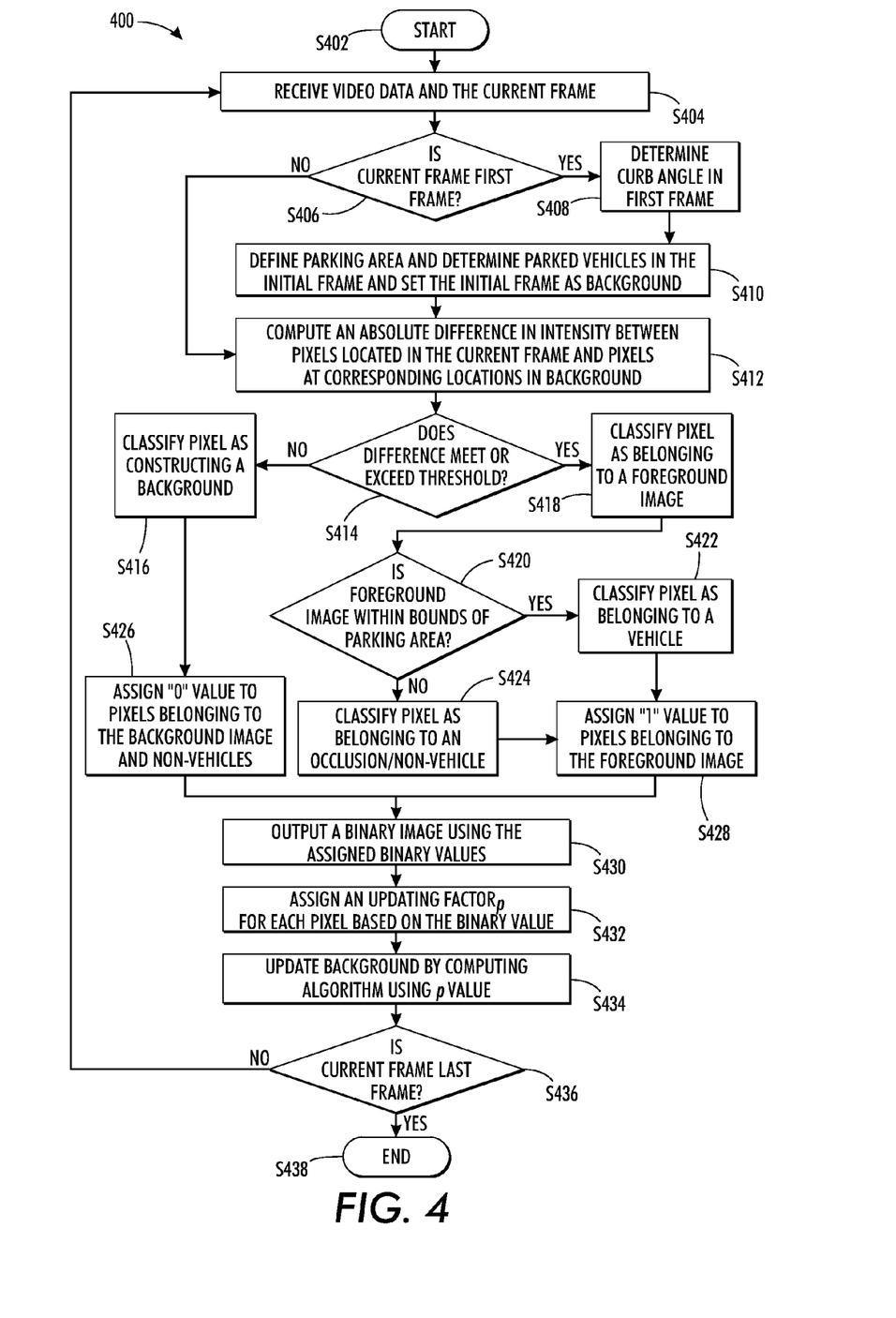
FIG. 4 is a flowchart describing a process for detecting a vehicle in a parking area.

FIG. 4 is a flowchart describing a method 400 for detecting a vehicle in a parking area. The method starts at S402. The video buffer module 116 receives video data from a sequence of frames taken from the image capture device 104 monitoring the parking area at S404. The system can process each frame in the sequence. Accordingly, the system determines whether the current frame is the initial frame of the sequence at S406. In response to the current frame not being the initial frame in the sequence (NO at S406), the system transmits the video data to the stationary vehicle detection module 120 for updating a background beginning at S412. In response to the current frame being the initial frame in the sequence (YES at S406), the system provides the video data to the curb angle and parking area determination module 118.

The curb angle determination module 118 determines an angle of the curb (hereinafter referred to as "curb angle $\theta_c$") in the initial frame at S408. The curb angle $\theta_c$ is determined as a reference value for a later-discussed analysis of a vehicle angle. The curb angle $\theta_c$ depends on the geometric configuration of the specific camera set-up. In this manner, the later-discussed vehicle angle $\theta_v$ can be analyzed using an actual position that the vehicle is parked relative to the curb in contrast to an incorrect calculation that might result from any tilt or rotation of the camera affecting the image plane relative to the parking area.

In one embodiment, a location of the curb in the image plane can be manually determined at a time when the camera is set up, installed, and/or calibrated. For example, actual coordinates falling on at least two points of the curb can be input into the system and used to output pixel coordinates. A virtual line connecting the pixels can represent the curb. An angle of the curb relative to the coordinate system defined by the pixel locations of the image plane can be calculated based on that determination at S408.

In another embodiment, the curb angle determination module 118 can automatically estimate the curb angle $\theta_c$ by searching for the longest line in the frame. Finding the longest line can be performed by using an algorithm such as a Hough transform, which can detect the longest line in an edge map of the static scene.

In another embodiment, the curb angle determination module 118 can automatically estimate the curb angle $\theta_c$ by using a heat map. The heat map can show the regions where motion occurs most frequently. In the on-street parking scenario, the flow of traffic can provide an estimate of the curb angle because the curb typically extends along (i.e., parallel to) a street that the traffic moves on. The traffic flow can be detected by processing multiple frames at time instants when vehicles are moving through the scene. The direction of traffic flow is the same as the direction the curb extends, so it can be used to detect the line representing the curb.

The line representing the curb is used at S408 to calculate the curb angle $\theta_c$, which is computed using the equation (1):

$$\theta c = \operatorname{atan}\left(\frac{y_2 - y_1}{x_2 - x_1}\right) \quad (1)$$

where $\theta_c$ is the curb angle with respect to the coordinate system defined by the pixel locations of the image plane and $(x_1,y_1)$ and $(x_2,y_2)$ are the coordinate locations of the start and end points of the detected line representing the curb, respectively. The curb angle $\theta_c$ is set in the initial frame for use in the analyses of the initial frame and each subsequent frame. There is no limitation made herein to the process used for determining the curb angle $\theta_c$. Any process understood in the art can be used.

Continuing with FIG. 4, the stationary vehicle detection module 120 is provided with video data. In response to the current frame being the initial frame being processed, the stationary vehicle detection module 120 estimates vehicle occupancy in the parking area at a start of the sequence using the static image captured in the initial frame. Generally, the positions of the parked vehicles in the initial frame are determined to detect objects and/or vehicles that are already present in the parking area. More specifically, the module 120 defines the parking area and uses the defined parking area to determine the vehicles that are parked in the initial frame at S410. In one embodiment, the module 120 can receive input designating the parking area in the video data. The input can be used to define a parking area boundary using a calibration process, such as by mapping actual coordinates to pixel coordinates. The parking area boundary is output as coordinate data.

In one embodiment, the module 120 uses a training-based classifier to classify pixels in the initial frame as belonging to one of vehicles and non-vehicles at S410. The classified pixel information is used in conjunction with the coordinate data to estimate occupancy. After the parked vehicles are determined, the background is initialized by setting the background as the initial frame. The background is used by the stationary vehicle detection module 120 to update a background in a current frame.

The stationary vehicle detection module 120 detects vehicles that park in the parking area or leave the parking area. Generally, the stationary vehicle detection module 120 highlights objects in the foreground, i.e., in the parking area of interest, of a video sequence when the image capture device is used to capture the video data. Once the background is estimated, the vehicles that park in the parking area or leave the parking area, after the initial frame, are detected by subtracting the selected frame from the estimated background and applying thresholding and morphological operations on the difference image. At each frame, the stationary vehicle detection module 120 detects movement of vehicles using temporal difference methods to check whether the detected vehicle is stationary or in motion. In the contemplated embodiment, a double-difference algorithm can also be used to detect objects in motion within the field of view of the camera.

With continued reference to FIG. 4, in one embodiment, the stationary vehicle detection module 120 computes an absolute difference in an intensity between pixels located in the current frame and pixels at corresponding locations in the background at S410. The difference between the current frame and the background is typically calculated only at positions where no motion is detected. The reason why the difference is calculated at only these positions is because motion resulting from possible occlusions and vehicular movement, such as, for example, due to a vehicle moving in and/or out of a space in a frame, might provide unreliable information regarding vehicle occupancy. The difference in intensity for each pixel at corresponding locations in the background and the current frame is then compared to a predetermined threshold at S412. In response to the difference not meeting the threshold (NO at S414), the pixel in the current frame is classified as constructing a background at S416. In response to the difference meeting the threshold (YES at S416), the pixel is classified as belonging to a foreground image at S418.

Figure 6A:
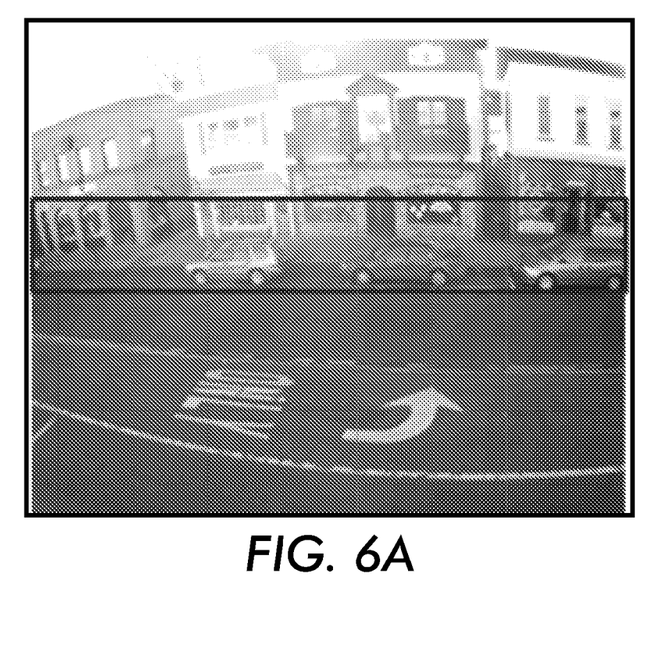
FIGS. 6A and 6B show foreground images that cause a vehicle and a non-vehicle/occlusion classification using an occlusion detection process for detecting vehicles.
Figure 6B:
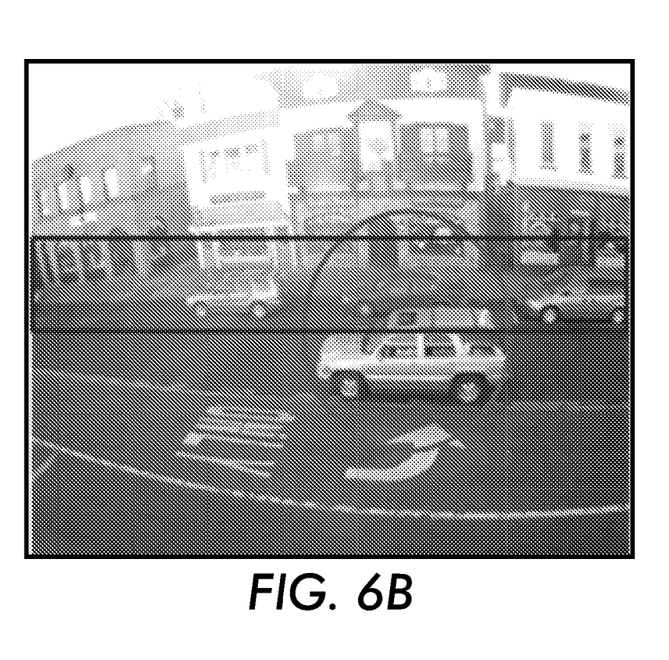

A verification module 122 can perform further processing on the foreground image to determine whether the foreground image pixels belong to one of a vehicle and a non-vehicle. When an object or a set of pixels, having a size that is reasonably large enough to be considered as a potential vehicle entering a scene is classified as a foreground change in the parking area, the verification module 122 applies an algorithm to determine if the detected object is actually a vehicle or a false detection. For example, FIG. 6A shows a foreground image that is detected as being inside the parking area while FIG. 6B shows a foreground image that is detected as being partially inside the parking area. The foreground image in FIG. 6B is actually an occlusion because the vehicle is captures partially in the parking area as it moves through the scene. Accordingly, in one embodiment, the processing can include occlusion detection for classifying images that cause a vehicle and a non-vehicle/occlusion. Occlusion can be detected in the current frame by computing an area of the foreground image that is partially detected in parking area. The area is used with the coordinate data (defining the parking area) to determine whether a majority of the detected image is inside or outside of the parking area. The select area is applied to a threshold at S420 to determine whether the foreground image is one of a vehicle and occlusion.

In another embodiment, the processing can alternatively or further include shadow suppression. When a classified foreground image includes a number of pixels that is large enough to be considered as a potential vehicle is detected (between frames), the image is processed as a foreground change in the parking area. Accordingly, a shadow suppression technique can be applied to the frame to eliminate portions of the foreground image that correspond to shadow areas. This operation can be performed by detecting shadow as including the regions having a chrominance that is similar to the background and a luminance that is substantially smaller than the background. The determined shadow is removed from the foreground image.

Further processes can be applied to confirm that the detected image is actually a vehicle or a false detection. In one embodiment, a confirmation can be performed using an algorithm for object recognition using principal component analysis (PCA) or training-based methods. In a further embodiment, the processing can include morphological operations.

In another embodiment, the module 122 can alternatively determine whether the pixels belonging to the foreground image satisfy predetermined size thresholds. Furthermore, the module 122 can determine whether the features, such as location, color, and shape characteristics, of the foreground object substantially match the features of the vehicle. For these embodiments, the stationary vehicle detection module 122 can generate a binary image indicating the location of pixels associated with the foreground object. Using the binary image, the verification module 122 can analyze each object to determine if the object is in-fact a vehicle based on its size, position, and motion characteristics. In a further embodiment, the module 122 can determine whether no motion is detected in the frame. In yet another embodiment, the module 122 can perform a combination of the determinations. There is no limitation made herein directed toward the type of processing that can be performed for classifying the foreground pixels.

The verification module 122 determines whether the pixels belonging to the foreground image are contained within the bounds of the defined parking area at S420. In response to the foreground image being contained within the defined parking area or satisfying any of the above determinations (YES at S420), the pixels of the foreground image are classified as belonging to the vehicle at S422. In response to the foreground image being only partially contained in the parking area (NO at S420), the pixels of the foreground image are classified as belonging to a non-vehicle, such as, for example, an occlusion at S424.

Figure 7A:
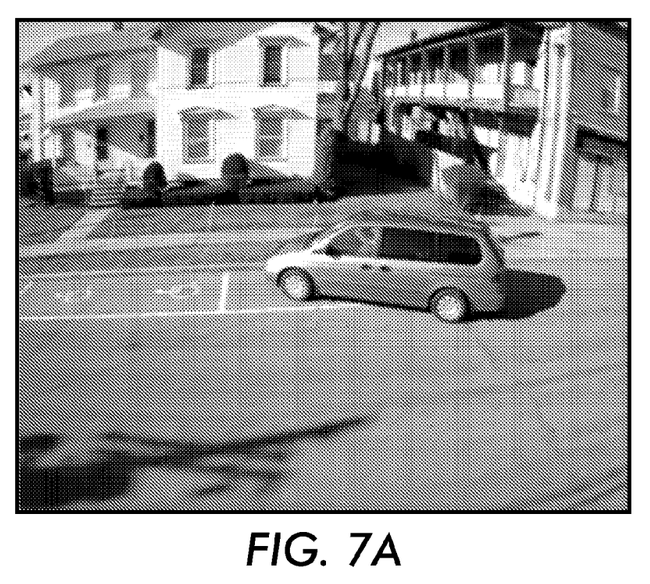
FIGS. 7A-7D shows a process for detecting a longest line in a foreground image region for computing an angle of a parked vehicle.
Figure 7B:
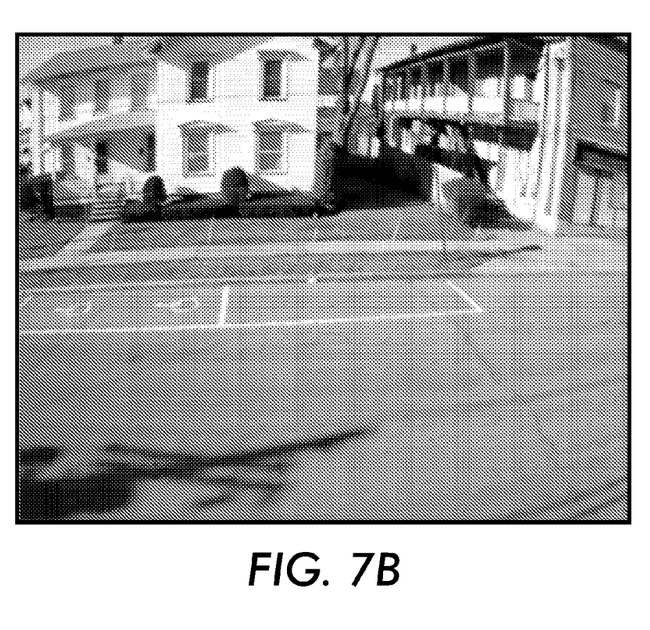

With continued reference to FIG. 4, after the pixels in the selected frame are classified, the stationary vehicle detection module 120 forms a binary mask by assigning a "0" value to the pixels corresponding to locations classified as belonging to the background construct at S416 and a "1" value to pixels corresponding to locations classified as belonging to the vehicles in the foreground image at S428. FIGS. 7A and 7B show example images of a current frame and an estimated background, respectively.

The stationary vehicle detection module 120 uses the assigned values to generate a binary image representing pixel classification results for the current frame at S430. The binary mask can have the same pixel dimensions as the captured video. This binary information is used for calculating an algorithm, which is used to update the background in each next frame of the sequence to determine when the initially parked vehicle subsequently moves away from and/or leaves the parking space or when a new vehicle enters the scene. In this manner, the system updates and/or self-corrects for undetected or missed vehicles as soon as these vehicles leave the scene.

The binary image output at S430, frame-by-frame, is used to update the background for each next frame of the sequence. The background is defined as and/or includes buildings, roads, or any stationary objects that surround the parked vehicles in the captured video data. The background is determined in the current (i.e., select) frame of the sequence by applying an updating factor p (i.e., a learning factor) that is computed for each pixel of a preceding frame to an algorithm used to compute the background of the current frame. In other words, the first updating factor p used in an algorithm is based on the classification of pixels resulting from a comparison (i.e. background removal) between a select frame and the background. For each subsequent frame, the process for determining the updating factor p is repeated by comparing a current frame with the background of a preceding frame and then the algorithm is computed for determining the background of the current frame. A difference between the current frame and the background of the preceding frame is determined to detect the vehicles.

One aspect of the present disclosure is that the updating factor p varies depending on the classification assigned to the pixel at S416 and S418, as belonging to the foreground and background image (and hence the binary value assigned to the pixel at S426, and S428), in the selected frame. The binary mask is used as input for determining an updating factor p for each pixel at S432. The selection of the updating factor p is particularly suited for detecting vehicles that park in the parking area during the time period that the sequence of frames is captured. In one embodiment, the following criteria can be used to set the updating factor p for each pixel at each time instant. The updating factor p can be assigned a "0" value for a pixel indexed by (i, j) if the binary output indicated that a foreground image was captured in the frame. In this manner, the updating factor p is "0" for any pixel belonging to a parked vehicle, a determined occlusion, or a detected movement.

Pixels belonging to the background construct at S416 do not get updated for corresponding locations in the sequence under these conditions. The updating factor p can be assigned a "1" value for a pixel indexed by (i, j) in frames that no longer include a previously stationary vehicle. In other words, the updating factor p is "1" when a parked vehicle has left the parking area. Accordingly, the background is recovered immediately by setting the updating factor to "1" for pixels at the location previously occupied by the vehicle. For all other pixels, the learning parameter is set to a value between zero and one ($0 \leq p \leq 1$) to update the background gradually. In one contemplated embodiment, the value can be set to 0.01.

One aspect of the disclosure is that the system applies the learning element to the updating factor p and uses the updating factor p as input when computing an algorithm used for background estimation at S434. In this algorithm, the background is initialized as the initial frame in the sequence of frames and gradually updates with each subsequent frame in the sequence. The algorithm is represented by the equation (2):

$$B_{t+1} = p^* F_{t+1} + (1-p)^* B_t \qquad (2)$$

where $B_t$ represents the background at time t, such as a background in the initial frame or the preceding frame;
$F_{t+1}$ is the select frame at time t+1, such as the current frame; and,
$0 \leq p \leq 1$ is the image updating factor.

Based on the above-mentioned values for the updating factor p that are assigned to each pixel, if the updating factor p is "1" for all pixels in a frame, then the estimated background at any given time is equal to the preceding frame. In other words, by applying the updating factor p=1 in the algorithm, the output value is indicative of a change in vehicle positions in the current frame from that in the preceding frame. If the updating factor p is selected as "0", the background at time t+1 remains the same as the background at time t. In other words, by applying the updating factor p=0 in the algorithm, the output value is indicative that there is no change in vehicle positions in the current and the preceding frame. Accordingly, the updating factor p controls the updating rate of the background.

The system then determines whether the current frame is the last frame in the sequence at S436. In response to the current frame not being the last frame in the sequence (NO at S436), the method 400 returns to S404 to repeat on the next frame. In response to the current frame being the last frame in the sequence (YES at S436), the updating method ends at S438.

Figure 5:
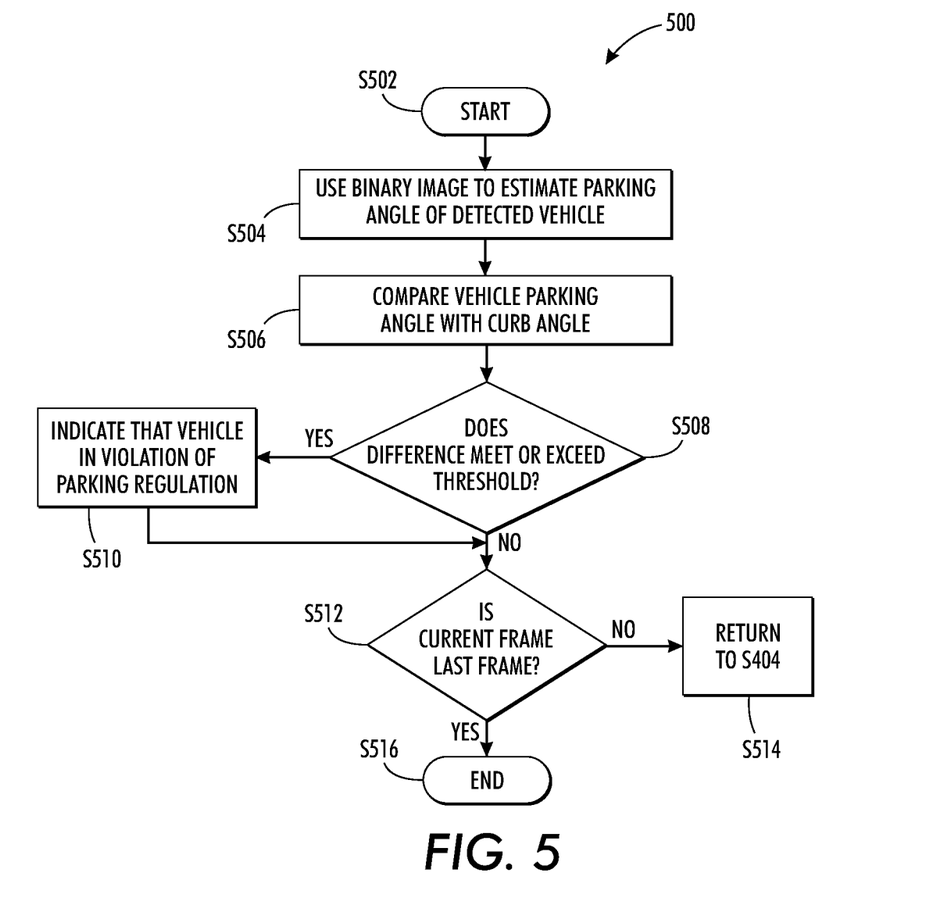
FIG. 5 is a flowchart describing a process for determining whether the detected vehicle is in violation of a parking angle regulation.
Figure 7C:
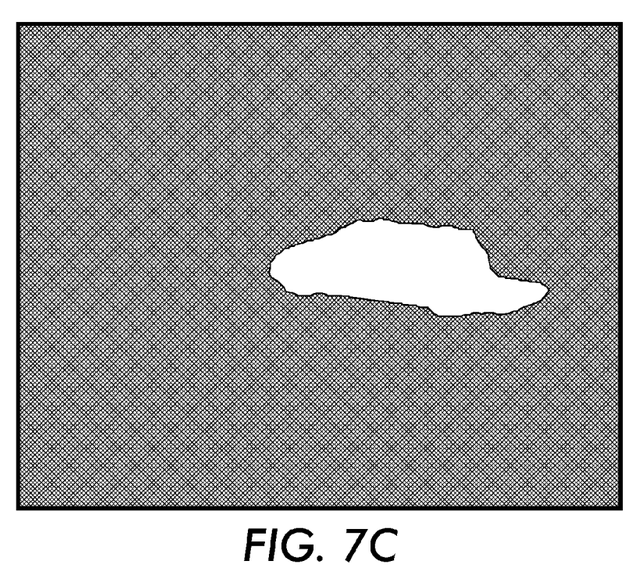

FIG. 5 is a flowchart describing a method 500 for determining whether the detected vehicle is in violation of a parking angle (i.e., parallel to the curb) regulation. The method starts at S502. Using the binary image (FIG. 7C), the vehicle angle determination module 124 estimates the angle of the parked vehicle (hereinafter referred to as "vehicle angle $\theta_v$") with respect to the coordinate system defined by the pixel locations of the image plane at S504. The module 124 can perform the estimation process by implementing one of a number of different algorithms.

Figure 7D:
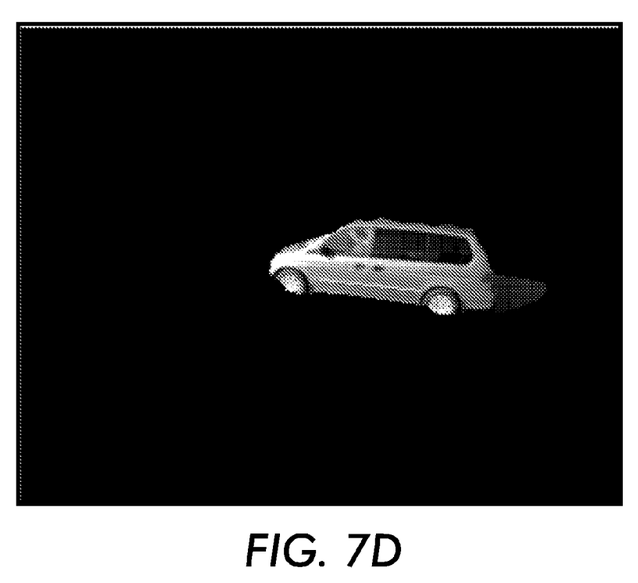

In one algorithm, the module 124 can detect the longest line in a process that is analogous to the process described for determining the curb in S408, such as by using a Hough transform. The curb was determined by using the algorithm on an edge map of the static scene at S408. The module 124 rather determines the presence of a vehicle by using the algorithm on the binary image and the current frame. Generally, the module 124 detects edges on the current frame corresponding to the regions defined by the binary image and searches for the longest line between different points falling on the edges (FIG. 7D). In another embodiment, the module 124 can detect tires in the image then apply a virtual line connecting centers of the tires.

Because vehicles are rigid objects and there is generally a contrast difference between the windows and the body of a vehicle or between the body and the street, a longest line is typically one that separates the windows from the body or the body from the road when the camera is oriented toward a side-view of the parked vehicle, providing that there is a sufficient contrast ratio within the image area corresponding to the detected vehicle and that the vehicle is not parked at an approximate 90-degree angle to the curb. Less of the vehicle profile is viewable by the camera when the vehicle parks at a 90-degree angle to the curb. A vehicle parked at an angle approximating 90-degree can cause the module 124 to identify a longest line representing a front or rear view of the vehicle. In this case, the algorithm can tend to provide less accurate results. However, a vehicle parked at approximately 90-degree to a curb is usually causing an extreme case of a parking angle violation. This type of violation is in rare occurrence.

Figure 8:
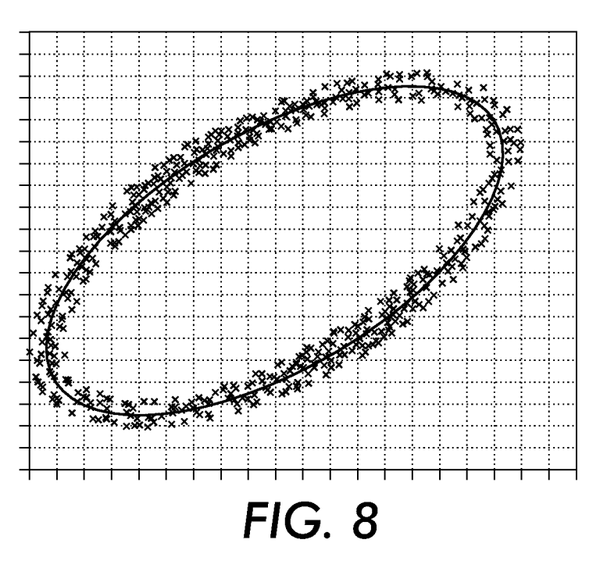
FIG. 8 shows an example ellipse generated during an alternate process using regression for determining the angle of the parked vehicle.

In another algorithm used as an alternate process for determining the longest line at S506, the module 124 can perform a regression process on the binary image representing the vehicle to fit an ellipse to points at the boundary defining the image. Generally, the module estimates parameters of an ellipse that fits the boundary of the detected blob in the binary image. One approach that can be used to fit an ellipse to the binary image includes using a regression model to extract data points from a boundary of the detected image. FIG. 8 shows an example ellipse that was generated using the regression approach. FIG. 8 plots a series of crosses (shown as "x"s) to represent the ellipse that is fitted to the data points. The regression model minimizes the sum of the squared distances computed from the perimeter of the ellipse to the data points along a radial line extending from the center of the ellipse to each data point. The regression process provides a major axis, which represents the longest line.

Another approach that can be used to fit an ellipse to the binary image includes determining a centroid of the binary image. The coordinates $(\bar{x},\bar{y})$ of the centroid can be computed using the respective equations (3) and (4):

$$\bar{x} = \frac{\sum I(x,y)x}{\sum I(x,y)}, \bar{y} = \frac{\sum I(x,y)y}{\sum I(x,y)} \quad (3,4)$$

where (x,y) are the coordinates of the pixels in the image that are counted in the sum and I is the binary image values in the frame-sized binary mask that was output from the preceding module. As mentioned, the binary image I was formed from assigned "1" and "0" values. Therefore, the sum of the area is not impacted by the background construct that was classified as being the "0" values.

Figure 9:
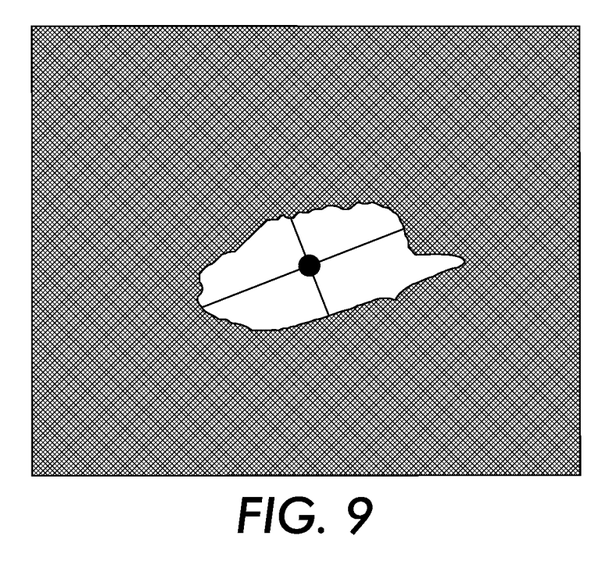
FIG. 9 shows an example centroid generated during an alternate process for determining the angle of the parked vehicle by finding orthogonal pair segments with the highest length ratio.

The module 124 determines orthogonal segments (i.e., pairs of lines) that perpendicularly bisect one another as they each pass through the centroid. The module 124 computes a length ratio for each pair of lines. This ratio is computed as the quotient between the longer line and the shorter line in each pair. The module 124 determines the pair of lines that has the highest computed length ratio. The longer line of the pair that results in the highest ratio is designated as the major axis of the ellipse (whereby the shorter line is designated as the minor axis). FIG. 9 shows an example centroid that is generated using this approach. The circle inside the detected binary image represents the centroid. The major and minor axes (having the highest length ratio) are shown in the figure as the two lines extending perpendicular to each other.

After one of the described approaches are applied to the binary image to determine start and end coordinates (or at least two coordinate) of a longest line or of the major axis of the ellipse, and module 124 uses the major axis to estimate the angle $\theta_v$ of the vehicle relative to the image plane. The angle of the longest line relative to the coordinate system defined by the pixel locations in the image plane can be used by module 124 to estimate the angle at which the vehicle is parked, which can be computed using the equation (5):

$$\theta_V = \operatorname{atan}\left(\frac{y_2 - y_1}{x_2 - x_1}\right) \quad (5)$$

where $\theta_v$ is the vehicle angle with respect to image plane and $(x_1,y_1)$ and $(x_2,y_2)$ are the coordinate locations of the start and end points of the detected line in the binary image representing the vehicle, respectively. We note that there is an equivalence between defining a line in a plane and defining two points to specify a line.

Continuing with FIG. 5, the vehicle angle $\theta_v$ is transmitted to the parking angle violation detection module 126. The module 126 compares the vehicle angle $\theta_v$ with the curb angle $\theta_c$ to compute an absolute difference $\theta_{c-v}$ at S506. Although, embodiments of the disclosure also contemplate the system alternatively computing an angle $\theta_{L1/L2}$ formed between the line L1 representing the curb and the line L2 representing the vehicle/major axis.

The difference $\theta_{c-v}$ (or the computed angle $\theta_{L1/L2}$) is compared with a predetermined threshold T for determining whether the vehicle is in violation of a parking angle regulation at S508. This threshold can be set according to relevant legislation. Optionally, the optical properties and configuration of the video capture system can be taken into account. For example, different thresholds can be set for different locations in the image in order to account for variations in measured angles due to local changes in the parameters of the projective transformations describing the relationship between the scene and the captured image. Alternatively, prior to computation of the curb and vehicle angles, pixel coordinates can be mapped to physical coordinates so that the resulting angles are invariant to perspective. In response to the difference meeting or exceeding the threshold (YES at S508), the module 126 indicates that a violation is detected at S510. The system can therefore transmit a signal to a user device 108, which can initiate enforcement of the parking angle regulation. In response to the area not exceeding the threshold (NO at S508), the system determines whether the current frame is the last frame in the sequence at S512.

In response to the current frame not being the last frame in the sequence (NO at S512), the method returns to S404 and proceeds to process the next frame. In response to the current frame being the last frame in the sequence (YES at S512), the method ends at S516.

Although the methods 300, 400, 500 are illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for determining a parking angle violation, the method comprising:
   receiving video data from a sequence of frames taken from an associated image capture device monitoring a parking area;
   determining a first line in a current frame where the first line represents a nominal orientation of the parking area;
   detecting a presence of a vehicle in the parking area;
   determining a second line in the frame where the second line represents an orientation of the detected vehicle;
   computing an angle between the first and second lines, the angle representing an orientation of the vehicle relative to a nominal orientation of the parking area; and,
   determining whether the detected vehicle is violating a parking regulation based on the computed angle.

2. The method of claim 1, wherein the determining the nominal orientation of the parking area is performed by a process selected from a group consisting of:
   determining an angle of the longest line in the scene detected by a Hough Transform;
   determining a dominant orientation of a motion heat map; and
   applying manually input data.

3. The method of claim 1, wherein the determining the orientation of the vehicle is performed by one of determining an angle of a major axis of a fitted ellipse to a boundary of the detected vehicle and determining an angle of a longest line in a body of the detected vehicle.

4. The method of claim 1, wherein the computing the angle includes:
   estimating a curb angle $\theta_c$ using the first line;
   estimating a vehicle angle $\theta_v$ using the second line;
   computing a difference between the curb angle $\theta_c$ and the vehicle angle $\theta_v$.

5. The method of claim 4, wherein the estimating the curb angle $\theta_c$ includes:
   determining the first line in the current frame representing the nominal orientation of the parking area;
   determining start coordinates and end coordinates of the first line;
   applying the start and end coordinates to an algorithm for determining an angle of a curb relative to a coordinate system of pixels in the image plane.

6. The method of claim 4, wherein the estimating the vehicle angle $\theta_v$ includes:
   determining start coordinates and end coordinates of the second line;
   applying the start and end coordinates to an algorithm for determining the angle of the vehicle relative to a coordinate system of pixels in an image plane.

7. The method of claim 1, wherein the determining whether the detected vehicle is violating the parking regulation includes:
   comparing the angle to a predetermined threshold;
   in response to the angle meeting or exceeding the predetermined threshold, indicating that the detected vehicle is in violation of the parking regulation;
   in response to the angle not meeting or exceeding the predetermined threshold, proceeding to process a subsequent frame in the sequence.

8. The method of claim 1, wherein the detecting the vehicle includes:
   determining whether the current frame is an initial frame of the sequence;
   in response to the current frame being the initial frame, initializing a background image; and
   in response to the current frame not being the initial frame, updating a background in the current frame by applying a predetermined updating factor p in an algorithm used to determine the background, wherein the updating factor p varies for each pixel in the current frame and depends on a classification of the pixel as belonging to one of a foreground image and a background construct.

9. The method of claim 1 further comprising:
   computing an absolute difference in an intensity between pixels located in the current frame and pixels at corresponding locations in one of a background image initialized in an initial frame and a background of a preceding frame;
   determining if the difference meets or exceeds a threshold; and,
   classifying the pixels in the select frame based on the difference and the threshold.

10. The method of claim 9, wherein the classifying the pixels includes:
    in response to the threshold not being met or exceeded, classifying a pixel as belonging to the background construct;
    in response to a threshold being met or exceeded, classifying the pixel as belonging to the foreground image.

11. The method of claim 9 further comprising:
    providing a binary image using the classified pixels, the providing including:
       assigning a "0" value to the pixels corresponding to locations classified as belonging to a background image, and
       assigning a "1" value to pixels corresponding to locations classified as belonging to a foreground image; and,
    processing the binary image for determining whether the detected vehicle is violating the parking regulation.

12. The method of claim 1 further comprising:
    in response to determining that the detected vehicle is violating the parking regulation, providing notice of the violation to a user device.

13. A computer program product comprising tangible media which encodes instructions for performing the method of claim 1.

14. A system for determining parking availability comprising:
    a parking angle determination device comprising memory which stores instructions for performing the method of claim 1 and a processor, in communication with the memory for executing the instructions.

15. A system for determining a parking angle violation, the system comprising:

a parking angle violation determination device, the determination device including:

a video buffer module adapted for receiving video data from a sequence of frames taken from an associated image capture device monitoring a parking area;

a curb angle determination module adapted for determining a first line in a current frame where the first line represents a nominal orientation of the parking area;

a stationary vehicle detection module adapted for detecting a presence of a vehicle in the parking area;

a vehicle angle determination module adapted for determining a second line in the frame where the second line represents the orientation of the detected vehicle;

a parking angle violation detection module adapted for computing an angle between the first and second lines and determining whether the detected vehicle is violating a parking regulation based on the computed angle, wherein the angle represents an orientation of the vehicle relative to a nominal orientation of the parking area; and, a processor adapted to implement the modules.

16. The system according to claim 15 wherein the curb angle determination module is adapted to:

determine the first line in the current frame representing the nominal orientation of the parking area;

determine start coordinates and end coordinates of the first line;

apply the start and end coordinates to an algorithm for determining an angle $\theta_c$ of a curb relative to a coordinate system of pixels in an image plane.

17. The system according to claim 16, wherein the parking angle detection module is adapted to compute a difference between the curb angle $\theta_c$ and the vehicle angle $\theta_v$.

18. The system according to claim 15, wherein the vehicle classification module is adapted to:

determine start coordinates and end coordinates of the second line;

apply the start and end coordinates to an algorithm for determining an angle $\theta_v$ of the detected vehicle relative to a coordinate system of pixels in an image plane.

19. The system according to claim 15, wherein the boundary violation detection module is adapted to:

compare the angle to a predetermined threshold;

in response to the angle meeting or exceeding the predetermined threshold, indicate that the detected vehicle is in violation of the parking regulation;

in response to the angle not meeting or exceeding the predetermined threshold, proceed to process a subsequent frame in the sequence.

20. The system according to claim 15, wherein the stationary vehicle detection module is adapted to:

determine whether a current frame is an initial frame of the sequence;

in response to the current frame being the initial frame, initialize a background image; and in response to the current frame not being the initial frame, update a background in the current frame by applying a predetermined updating factor p in an algorithm used to determine the background, wherein the updating factor p varies for each pixel in the current frame and depends on a classification of the pixel as belonging to one of a foreground image and a background construct.

* * * * *